(12) United States Patent
Birmingham

(10) Patent No.: US 7,794,094 B2
(45) Date of Patent: Sep. 14, 2010

(54) SYSTEM AND METHOD FOR MULTI-DIRECTIONAL POSITIONING OF PROJECTED IMAGES

(75) Inventor: Tom Birmingham, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 661 days.

(21) Appl. No.: 11/441,974

(22) Filed: May 26, 2006

(65) Prior Publication Data

US 2007/0273845 A1 Nov. 29, 2007

(51) Int. Cl.
G03B 21/14 (2006.01)
G03B 3/00 (2006.01)
G03B 21/22 (2006.01)
G03B 21/00 (2006.01)

(52) U.S. Cl. ............... 353/122; 353/69; 353/70; 353/101; 353/119

(58) Field of Classification Search ............ 353/119, 353/69–70, 5, 46, 79, 122, 101; 359/446
See application file for complete search history.

(56) References Cited

U.S. PATENT DOCUMENTS

| 5,442,414 | A | * | 8/1995 | Janssen et al. ............ 353/98 |
| 5,774,174 | A | * | 6/1998 | Hardie .................. 348/38 |
| 5,988,817 | A | * | 11/1999 | Mizushima et al. ......... 353/94 |
| 6,115,022 | A | * | 9/2000 | Mayer et al. ............. 345/418 |
| 6,431,711 | B1 | * | 8/2002 | Pinhanez ................ 353/69 |
| 6,540,361 | B1 | * | 4/2003 | Hayashi ................ 353/31 |
| 6,626,540 | B2 | * | 9/2003 | Ouchi et al. ............. 353/31 |
| 6,671,005 | B1 | * | 12/2003 | Pujol et al. ............. 348/771 |
| 6,821,125 | B2 | * | 11/2004 | Sekiguchi et al. ......... 434/284 |
| 6,854,850 | B2 | * | 2/2005 | Yaniv .................. 353/94 |
| 6,866,402 | B2 | * | 3/2005 | Belliveau ............... 362/272 |
| 6,963,348 | B2 | * | 11/2005 | Diamond et al. .......... 345/647 |
| 7,001,023 | B2 | * | 2/2006 | Lee et al. ............... 353/69 |
| 7,104,653 | B2 | * | 9/2006 | Moriwaki et al. .......... 353/69 |
| 7,134,080 | B2 | * | 11/2006 | Kjeldsen et al. .......... 715/730 |
| D550,747 | S | * | 9/2007 | Sassano ................ D16/221 |
| 7,349,013 | B2 | * | 3/2008 | Kyuma ................ 348/240.1 |
| 7,443,565 | B2 | * | 10/2008 | Uchiyama et al. ......... 359/259 |
| 7,530,019 | B2 | * | 5/2009 | Kjeldsen et al. .......... 715/730 |
| 2003/0098957 | A1 | * | 5/2003 | Haldiman ............... 353/69 |

* cited by examiner

Primary Examiner—Georgia Y Epps
Assistant Examiner—Jori S Reilly-Diakun
(74) Attorney, Agent, or Firm—John P. O'Banion

(57) ABSTRACT

A system and method of multi-directional projection in which the optical output from a projector is modified in response to characteristics of nearby surfaces, upon which projection can be directed. The multi-directional projection system can provide beneficial output as a primary indicator or a secondary indicating device that can be controlled by itself or synchronously with other devices, such as output from a computer monitor. One implementation incorporates an optical sensor coupled to the projector for registering object characteristics (e.g., distance, reflectance, texture, color, and ambient lighting), such as during a mapping operation performed across the pan and tilt range of the projector. The projection system preferably incorporates a focusing assembly and may include other controllable optical elements such as zoom. Control is preferably provided through commands within an application programming interface (API), such as executing on a personal computer or other form of computer device.

25 Claims, 4 Drawing Sheets

SYSTEM AND METHOD FOR MULTI-DIRECTIONAL POSITIONING OF PROJECTED IMAGES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF INVENTION

1. Field of Invention

This invention pertains generally to image projection, and more particularly to a system and method for controlling the location to which an image is projected and modifying the projected image based on characteristics of that location.

2. Description of Related Art

Conventional projectors are configured with a fixed projection element for projecting images, ranging from still images to full-motion video images, in a fixed direction. Typically these projectors require manual adjustment to properly align the output to a rectangular viewing screen. The output of these projectors is configured for being directed at a flat surface that is suitably sized and of a suitable material to properly reflect the light back to the viewer to provide a clear, non-distorted view.

These conventional projectors are typically utilized in the same manner and for the same purposes as computer monitors or television display screens. However, in developing the system and method taught herein, it has been recognized that conventional projectors are unable to provide an active viewing experience that surrounds the viewer.

Therefore, a need exists for a projection system and method that allows images to be projected at different locations in the surroundings of the viewer. The present invention satisfies those needs, as well as others, and overcomes the deficiencies of previously developed fixed-position projection systems.

BRIEF SUMMARY OF INVENTION

A projection system and method is described which provides for projection of images, ranging from still images to full motion video images, within an environment that can contain irregular surfaces (e.g., irregular with regard to distance, angle, surface material, color, lighting, size, shape, and so forth) onto which an image is projected. More particularly, the system and method provides for multi-positional control of the location to which images are projected as well as for image modification based on characteristics of the location. By way of example, and not of limitation, an aspect of the system and method is that the direction of image projection can be changed under program control in one or more dimensions, such as by changing horizontal and vertical projection angles (e.g., pan and tilt). Another aspect of the system and method is that the image is modified based on characteristics of the location to which the image is projected. Another aspect of the system and method is to access those characteristics using a map which has been loaded into a memory storage area accessible to the system. The map maintains characteristics of surrounding surfaces obtained from a mapping operation performed, for example, during a setup process. During operation, software retrieves characteristic values from within the map for the projection direction (e.g., indexed by pan and tilt angle values) and modifies the projected image to compensate for characteristics of the surroundings onto which the image is being projected.

The term "projection system" is generally used herein to describe a combination of a projection head and a projection control module. In one embodiment, the projection head comprises a projection element for projecting an image, as well as one or more motion control elements (e.g., actuators) for changing the direction of image output from the projection element. The projection control module comprises a control processor, such as a computer, that communicates with the projection head and controls its motion to project an image, either smoothly or stepwise, onto different projection locations (e.g., first location, second location, third location, . . . nth location) based on information retrieved from a map of projection location characteristics. Motion can be similarly directed in response to giving a direction and a time or distance value, instead of the discrete location values described above. Input for controlling the projection system is received by the projection control module such as from application programming.

One aspect of the projection system and method is the capability to display images which are not constrained to being projected onto a rectangular display screen or area. This projection system and method allows for the display of text, graphics, images (ranging from still images to full-motion video), and combinations thereof either statically or in motion on surfaces in the vicinity of projection.

In one embodiment, an image projection element provides the directed light output for the projection system. The image projection element is configured for directing the light output across a range of directions, using, for example, one or more motion control elements such as motorized actuators to rotate the image projection element along one or more axes, such as horizontally (pan) and vertically (tilt). Depending on the specific application, the projected images can be used as a primary (main) output from the application or as a secondary (auxiliary) output; for example, to operate in a synchronized manner with a primary output such as a conventional flat panel display screen. When operating as a secondary display, the projection techniques described herein operate without interfering with output from the primary output, and provide additional display output to be seen by the user within locations surrounding the projection head. According to the teachings herein, any number of projection heads can be controlled by a projection control module depending on the configuration of the application program.

A number of advantages are provided by the system and method described herein. In contrast to the image output provided by a fixed panel display, this projection system allows image output to be readily displayed anywhere, providing information where it is needed as a dynamic display or accompaniment to conventional display screens, control of optically sensitive devices, and other uses. In one embodiment, this projection system is configured to provide one or more additional application displays without "interrupting" the main user display screen.

The projection system is suitable for use in any application that requires display of an image (e.g., still, sequence, and/or video). Such an image can be associated with, for example, passive entertainment, interactive entertainment, commercial information technology (IT), personal computer (PC) applications, and communications. The following are provided by way of example and not by way of limitation. Entertainment uses include: "move to the music (or video)", video, gaming, game play information, text, video chat, game integration (e.g., laser shots, game stats, sprites, creatures, and so forth). Examples in the IT area include: instant message (IM) text, phone number display, image display of persons, general info, weather, stock prices, and so forth. Examples with email include: email arrival notification, email text (static/scrolling) information that is "pushed" to users over a network, and other applications where directed output is beneficial.

The projection system described herein can also be used in a wide variety of situations and locations. By way of example, and not limitation, these locations include: family room (entertainment center), home PC, office PC, mobile, cell phone, laptop as well as other desired locations.

The teachings herein are amenable to embodiment in a number of ways, including but not limited to the following descriptions.

In one embodiment, an image projection system according to the teachings herein includes (i) an image projection element, (ii) motion control element, coupled to the image projection element and configured for moving an image projected by the image projection element from a first projection location to a second projection location, and (iii) a control processor configured for receiving an electrical source signal and converting the signal to an image for projection by the image projection element, actuating the motion control element in response to receipt of a motion control command, and modifying the electrical source signal according to a map of projection location characteristics.

In one embodiment, the image projection element includes a light source, a modulation element configured for modifying intensity, color, or both intensity and color, of light from the light source, and an optical assembly configured for projecting the light from the image projection element, wherein the light source and the modulation element convert the electronic source signal into the image for projection by the optical assembly.

In one mode, the motion control element controls horizontal angular motion. In another mode, the motion control element controls vertical angular motion. In another mode, the motion control element controls both horizontal angular motion and vertical angular motion.

In another embodiment, an image projection method according to the teachings herein includes (i) projecting an image onto a first projection location, (ii) receiving a command to project the image onto a second projection location, (iii) moving the image from the first projection location to the second projection location, and (iv) modifying the image in accordance with mapped characteristics associated with the second projection location.

In one mode, modifying the image comprises changing optical characteristics of projection. In another mode, modifying the image comprises modifying signals carrying the image prior to projecting the image onto the second projection location. In another mode, modifying the image comprises both changing the optical characteristics of projection and modifying the signals carrying the image.

In one implementation, a projection system according to the teachings herein includes the following: (a) an image projection element configured for projecting an image; (b) a motion control element, or elements, coupled to the image projection element, for changing the direction of the projected image from a first projection location to a second projection location; (c) a computer processor; and (d) programming executable on the computer processor for carrying out the operations of (i) generating a map of characteristics for projection surfaces within the surroundings of the image projection element, (ii) receiving an electrical source signal for conversion to an optical output on the image projection element, (iii) controlling the motion control element(s) to change the direction of the optical output in response to the receipt of a motion command, and (iv) modifying the electrical source signal according to characteristics stored within the map for the direction of the optical output. In one embodiment, the map is pre-generated and is accessed by the programming. In one embodiment, the image is stored in the map.

In another implementation, a projection method includes: (a) mapping areas surrounding an image projection element (e.g., within a projection head) to create a map of surfaces onto which an image can be projected; (b) conversion of an electrical signal to a projected optical output from the image projection element; (c) changing the direction of the projected optical output emanating from the image projection element in response to motion commands; and (d) modifying the projected optical output by utilizing correction factors determined from information obtained from the map for the direction of projected optical output.

In another implementation, a projection method includes: (a) projecting an image from an image projection element onto a first projection location; (b) receiving a command to move the image onto a second projection location; (c) activating a motion control element coupled to the projection element to move the output image from the first projection location to the second projection location; and (d) modifying image output in response to accessing mapped characteristics associated with the second projection location. The image output can be modified by changing optical properties of the projection element, and/or by performing image processing on the image signals prior to being projected.

Embodiments of the system and method can provide a number of beneficial aspects which can be implemented either separately or in any desired combination without departing from the present teachings.

For example, one aspect of the invention is to provide for changing locations onto which images are projected from a projector which can be controlled from an application program.

Another aspect is to provide for changing locations onto which images are projected by a projector in which the motion is synchronized with an application program which may be outputting additional information on other output devices, such as video display screens.

Another aspect is to provide for projection of images on surfaces nearby a projector which can be irregular in shape, slope, composition, and located at varying distances.

Another aspect is to provide for projection of images based on mapping of the surrounding projection areas so that correction can be applied to the projected output in response to the map for any given output direction.

Another aspect is to provide for projection of images in which optical output modification, such as focus and zooming operations, can be controlled in response to commands from the application in combination with map information.

Another aspect is to provide a projection system in which an optical sensor coupled to the device registers characteristics of the surroundings.

Another aspect is to provide a projection system in which the optical sensor is mounted to, or integrated with, the projector element, wherein the projection apparatus and sensor move together pointing in the projection direction.

Another aspect is to provide a projection system in which the optical sensor provides distance information on objects in the surroundings of the projection apparatus.

Another aspect is to provide a projection system in which the optical sensor can register numerous characteristics of the surroundings, such as distance, reflectivity, texture, color, ambient lighting and other desired characteristics.

Another aspect is to provide a projection system in which the output of the projection apparatus can be directed onto a nearby electronic device, which is configured for optical remote control, for communicating remote control commands to that device.

Another aspect is to provide a projection system in which commands within an application programming interface (API) layer can be accessed by any application programs executing on the computer.

Another aspect is to provide a projection system to display text, graphics, images, icons, simple vector graphics, and to output optical sequences for controlling devices configured for receiving optical inputs.

Another aspect is to provide a projection system to augment the displays for gaming, video presentation, slide presentation, conference calls, phone calls, text messaging, instant messaging, e-mail messages, information displays (e.g., weather, stocks, sports, email arrival indicator, and so forth), and other applications in which additional optical output is desired.

Another aspect is to provide a projection system in which the motion is performed responsive to one or more audio and/or video streams being output on another device, such as a computer display.

A still further aspect is to provide a projection system in which the projection output and motions can be controlled remotely by a local user or a remote user such as over the internet.

Further aspects of the system and method will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF INVENTION

Referring more specifically FIG. 1 through FIG. 6, an embodiment of the invention will now be described in detail. It will be appreciated that the system may vary as to configuration and as to details of the parts, and that the method may vary as to the specific steps and sequence, without departing from the basic concepts as disclosed herein.

Figure 1:
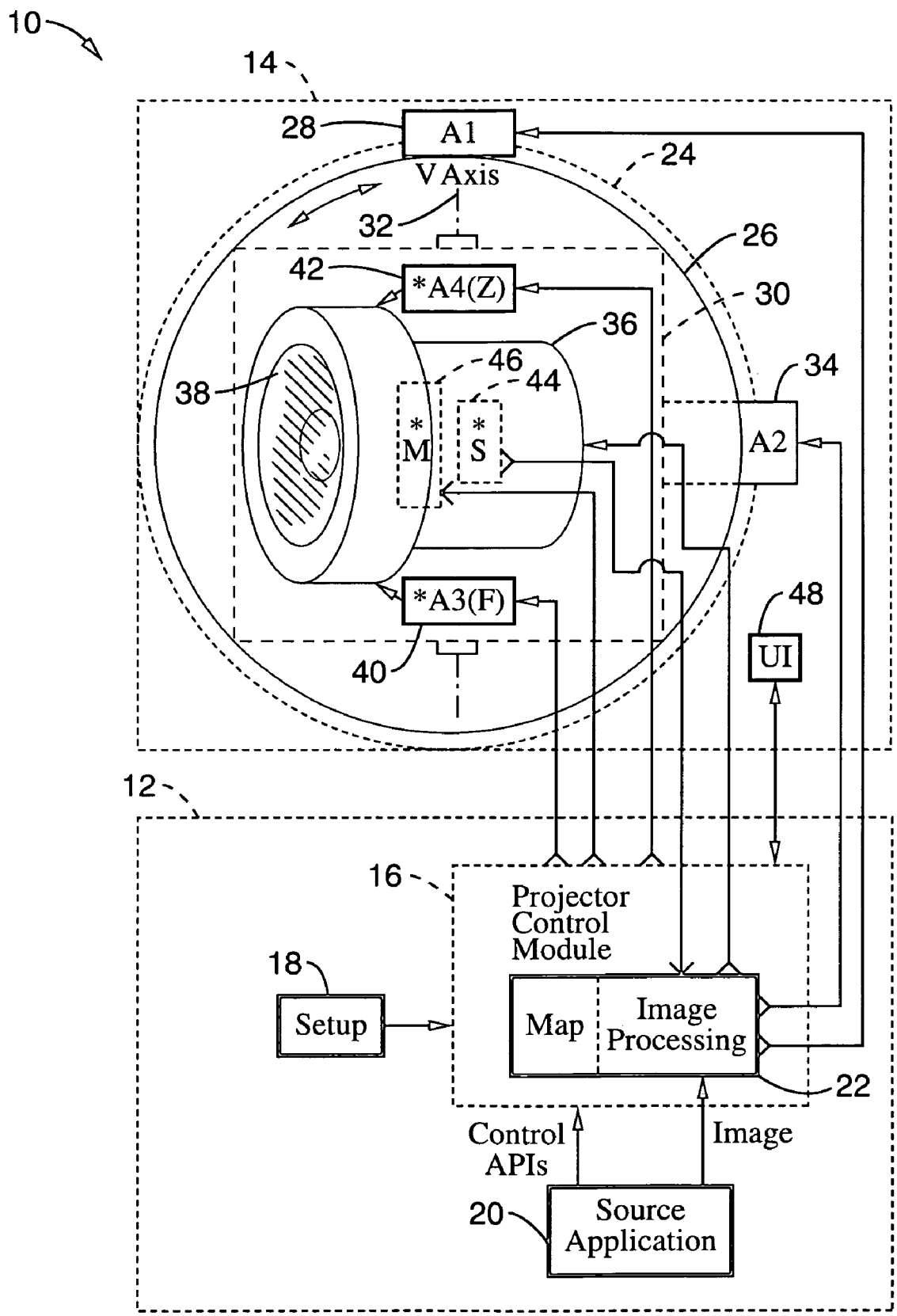
FIG. 1 is a block diagram of a projection motion control system according to an embodiment of the present teachings, showing the projection apparatus and control programming elements.

FIG. 1 illustrates an embodiment of a multi-directional output projection system 10 having a computer 12 coupled to a projection head 14. Although shown as a wired connection, it should be appreciated that computer 12 can alternatively communicate with projection head 14 over a network connection, wireless connection, or using power-line communication mechanisms.

Software for controlling the projection system is shown associated with computer 12, and includes a projector control module 16, setup module 18, source application 20, and map based image processing routine 22.

Projection head 14 is shown as including a stationary base member 24 upon which is attached a movable upper housing 26, such as rotatably coupled to one another to provide a first degree of motion (e.g., pan). A motion control element, such as depicted as a first actuator (A1) 28, is configured to impart motion to upper housing 26, such as rotating upper housing 26 in relation to stationary base member 24. It should be noted that stationary base member 24 can be mounted in any desired relationship to the movable upper housing 26 (e.g., above, below, to the side, and so forth), depending on the application and specific conditions.

A swivel assembly 30 within upper housing 26 is adapted for rotation, such as through axis 32, to impart a second degree of motion (e.g., tilt) in response to the operation of a motion control element depicted as a second actuator (A2) 34. An image projection element 36 is configured for converting received image signals to an optical output.

A lens assembly 38 is shown coupled to image projection element 36 for focusing the output of the projector. Additional control assemblies can be coupled to image projection element 36 for controlling additional degrees of motion or other parameters. In the implementation shown, a third actuator (A3) 40 is shown for controlling the focus of lens assembly 38, and a fourth actuator (A4) 42 is shown for controlling the zoom of lens assembly 38. An asterisk '*' is shown within elements 40–46 of the figure to clearly denote these elements are optional.

It should be appreciated that the motion control elements described above can be implemented with any desired form of electromechanical actuator elements, such as utilizing motor drive assemblies (e.g., geared motors), muscle wires, piezomotors, and so forth for controlling horizontal angular displacements (pan), vertical angular displacements (tilt), and optionally other controls such as focus and zoom.

It will be appreciated that the system can incorporate any desired number of optional features. For example, optical image modification assemblies can be operably coupled to the projector element, such as a focusing lens, zoom lens, or other optical elements and combinations thereof. Incorporating a focusing assembly, such as a focusing lens with focusing actuator, provides a mechanism for changing the focus of the image projector based on distance to the surface upon which the output is projected. In a similar manner, a zoom lens with actuator can be incorporated and controlled for changing the size and intensity by changing the angle subtended by the projection cone of the optical output in response to programming based on the map and/or commands received from application programming.

By way of example, and not limitation, a sensor 44 is shown for registering characteristics of surfaces within the vicinity of projection head 14. The sensor can facilitate mapping of surfaces in the vicinity of the projection system. In one implementation sensor 44 is an image sensor which operates through the same lens as projector element 36. Alternatively, sensor 44 can be implemented as a separate image sensor having its own optics. As still another example, sensor 44 may comprise a distance registration sensor (i.e., ultrasonic, laser). It should be appreciated that sensor 44 can comprise any sensor configured for detecting characteristics of projection surfaces in the vicinity of projection head 14.

Another optional feature is exemplified as a pixel redirection device, such as a mirror array 46, which allows the system to simultaneously direct any desired collections or groups of pixels within an image to different locations offset from the projection element direction. This option allows the projector to create distributed and/or sparse effects spanning a larger distance. Considering an example of use within a video game, multiple objects can be shown moving about in the surroundings within a field of view that otherwise exceeds a conventional projection cone. This option also allows multiple elements to be output within a single image, for instance a plurality of icons or sprites (e.g., moving icons), that are then moved by the mirror array, while the projection direction can be stationary or traverse a path.

An optional user interface 48 is shown coupled to the projection head 14 for providing status information and interaction with a user. The user interface can include any desired input selectors, (e.g., buttons, switches and the like), and/or output indicators (e.g., power indicators, status LEDs, displays, audio annunciators, and so forth).

The following describes an embodiment of the software of the system in greater detail. Still referring to FIG. 1, setup module 18 is shown for configuring the projector, initializing it, inputting a map of the surroundings and other related functions. In one mode, the map of the surroundings can be input to the projection system in the form of a "Map Description File" which details the surfaces with respect to the location of the projection element. Alternatively, or additionally, a map can be generated by the system by traversing a set of directions and processing information collected by sensor 44, such as performed during the setup process.

The software processing steps include the loading of, or alternatively the creating of, a map of characteristics for nearby surfaces within the memory for access by the computer. Preferably this map description includes information within at least the movable range of projection. One embodiment of the map is configured to represent projection locations as respective pan and tilt angles. Another embodiment of the map is configured to represent room size (e.g., assume rectangular box), projector position within the room, and room objects (position, shape). It should be recognized, however, that any convenient representation apparatus can be utilized.

Considering the mapping of projection surfaces based on pan and tilt angles, it will be appreciated that the map may be implemented in a two dimensional array for retaining characteristic data for the different pan and tilt values (at whatever angular resolution desired). Furthermore, to reduce processing overhead, a pointer can be used for accessing fields within a memory block retained for the map. In this way the map is accessed using retrieval based on a pointer generated in response to pan and tilt values. For example, left-shifting the pan value by x bits (i.e., multiplication), then left-shifting the tilt value by y bits (where y<x) then adding a field offset value, wherein the desired projection parameter can be retrieved via pointer for the respective projection direction.

One or more source application programs 20 are shown in FIG. 1 which are adapted for executing on computer 12, or alternatively another computer in communication with computer 12, and generating image data for output by the projector as well as generating control commands for controlling the movement and operations of the projector. In the example shown, an electrical source signal containing the image, image stream, or video is communicated from application program 20 to projector control module 16. In addition, control commands are passed to the projector for controlling motion, and image effects. The output of the projection system can be controlled by local programming, such as application programming executed on an associated personal computer, or control can be performed from a remote device, such as over a dedicated control line, a private intranet, or over the public internet, and the like.

By way of example, and not limitation, a number of application program types are particularly well suited for primary or auxiliary use of the described multi-directional projection, such as: video games, video presentation, slide presentation, conference calls, phone calls, text messaging, instant messaging, e-mail messages, information displays (e.g., weather, stocks, sports, email arrival indicator, and so forth), and other applications that can benefit from creating external multi-directional optical projections. It should be appreciated that the applications can be configured to operate the projection system as a sole display output, or as an output to augment other forms of output, such as generated by a video monitor, audio system and so forth.

Map/image processing routine 22 within projector control module 16 is configured for changing the projected output in response to map characteristics for a given output direction. In one mode, the image processing routine processes the output based on the projected direction while taking into account the respective size of the projected image, because the projected output may extend across surfaces having different characteristics and at different distances from the projector. In one mode, map/image processing routine 22 modulates the focus of the image in response to distance information within the map. In another mode, the image processor modifies the image signal and also controls the focus based on correction factors determined for the current mode of operation from information retrieved from the map.

In one mode, the image processing software controls and/or modifies the images or video signals so that images are projected correctly to suit the different surfaces within the space surrounding the projection head. Modification of projected output is performed based on a map of characteristics for the area surrounding the projector element. The goal is to correctly project the image that is given to the projector module. In one preferred mode of operation no image processing is performed unless required to modify the image to display correctly in the current position within the mapped space. The image is only changed to project onto a surface that changes as the projection direction is changed.

During operation, the projector programming controls the motion control element(s) to change the direction of the optical output in response to the receipt of a motion command and it modifies the optical output from the projector, the electrical source signal, or both optical and signal modification, based on the characteristics found in the map for the given projection direction.

It should be appreciated that elements (e.g., actuators) within projector unit 14 can be directly controlled through external signals, as shown, or received by control circuitry of an interface for communicating between the projector unit and computer 12.

Figure 2A:
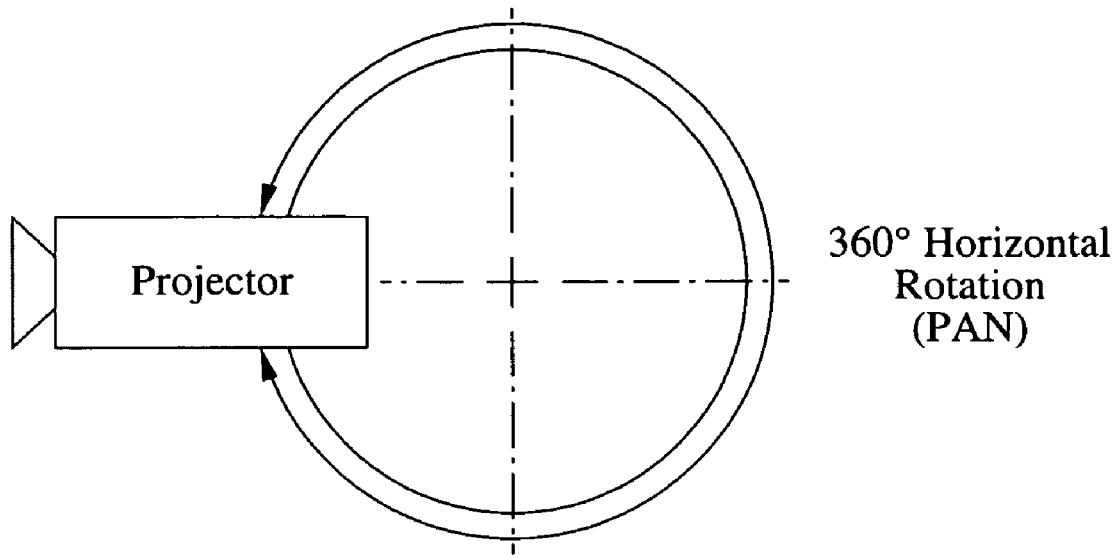
FIG. 2A is a top schematic view of projection illustrating horizontal motion (pan) according to an aspect of the present teachings.
Figure 2B:
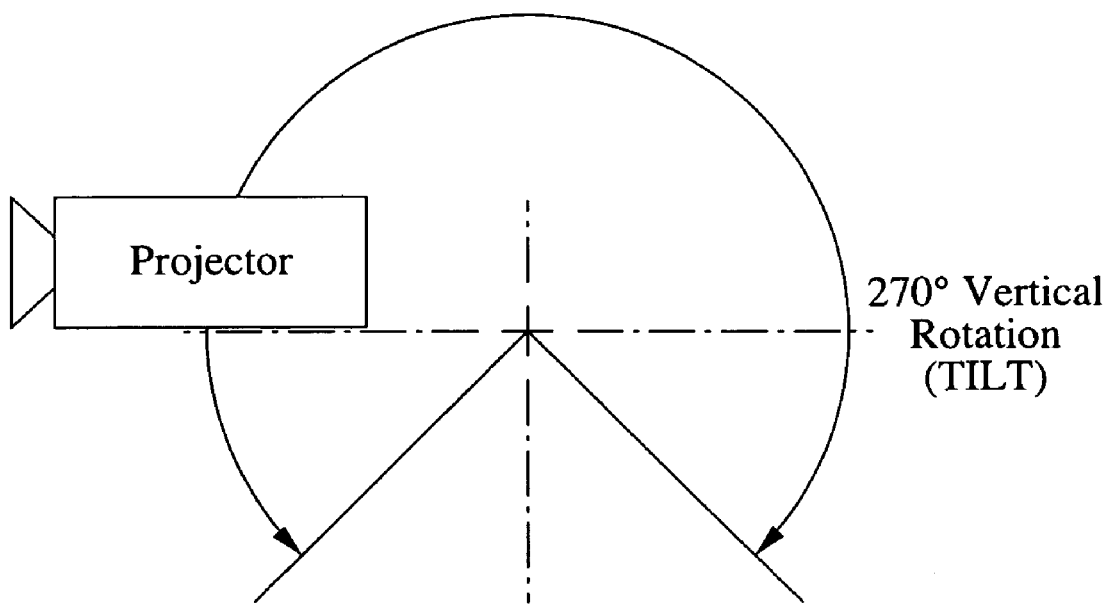
FIG. 2B is a side schematic view of projection illustrating vertical motion (tilt) according to an aspect of the present teachings.

FIGS. 2A through 2B illustrate an example of pan and tilt ranges, such as covering a full range of pan and tilt (360° by 360°) or any desired portion thereof such as 360° pan and 270° tilt as shown in the figures, through which the projected output can be moved in response to control of the motion control elements. It should be appreciated that the actuator mechanisms can be configured to produce any desired range of motion for a given application.

Figure 3:
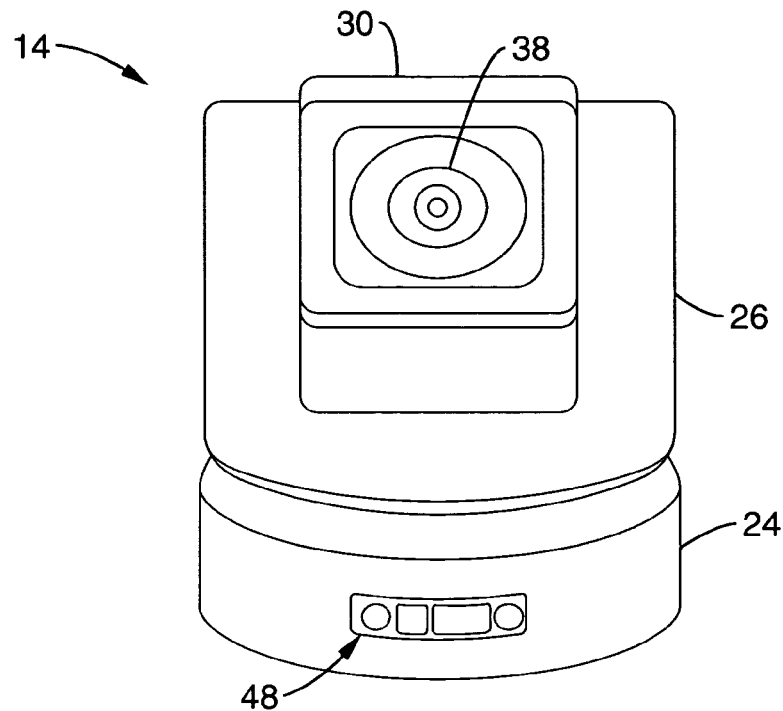
FIG. 3 is a front view of a projection apparatus according to an embodiment of the present teachings.

FIG. 3 illustrates an example physical embodiment of a projection head 14. Stationary base member 24 is rotatably coupled to a movable upper housing 26 which is configured for rotation through a horizontal angular displacement (pan). A swiveling portion 30 of upper housing 28 incorporates the projection element having lens 38 as seen in the figure. In response to swiveling of swiveling portion 30, the projection element can be moved through vertical angular displacements (tilt). Projection head 14 is configured for receiving both image and control signals, for example a first input for receiving an image or video stream and a second input for receiving motion and focus commands. Furthermore, additional commands and status can be communicated between the projection unit and computer depending on the specific hardware and applications being supported.

An optional user interface 48 is shown by way of example integrated into base 24, although it can be alternatively integrated within any portion of the system, or coupled to the system, or based on a wireless remote control and any desired combinations thereof. The user interface facilitates displaying status to the user and/or collecting user input for the projection system. By way of example and not limitation, user interface 48 contains input selectors (e.g., switches, buttons) and/or output indicators (e.g., LED power light, status light, segmented display, audio annunciators, and so forth).

Figure 4:
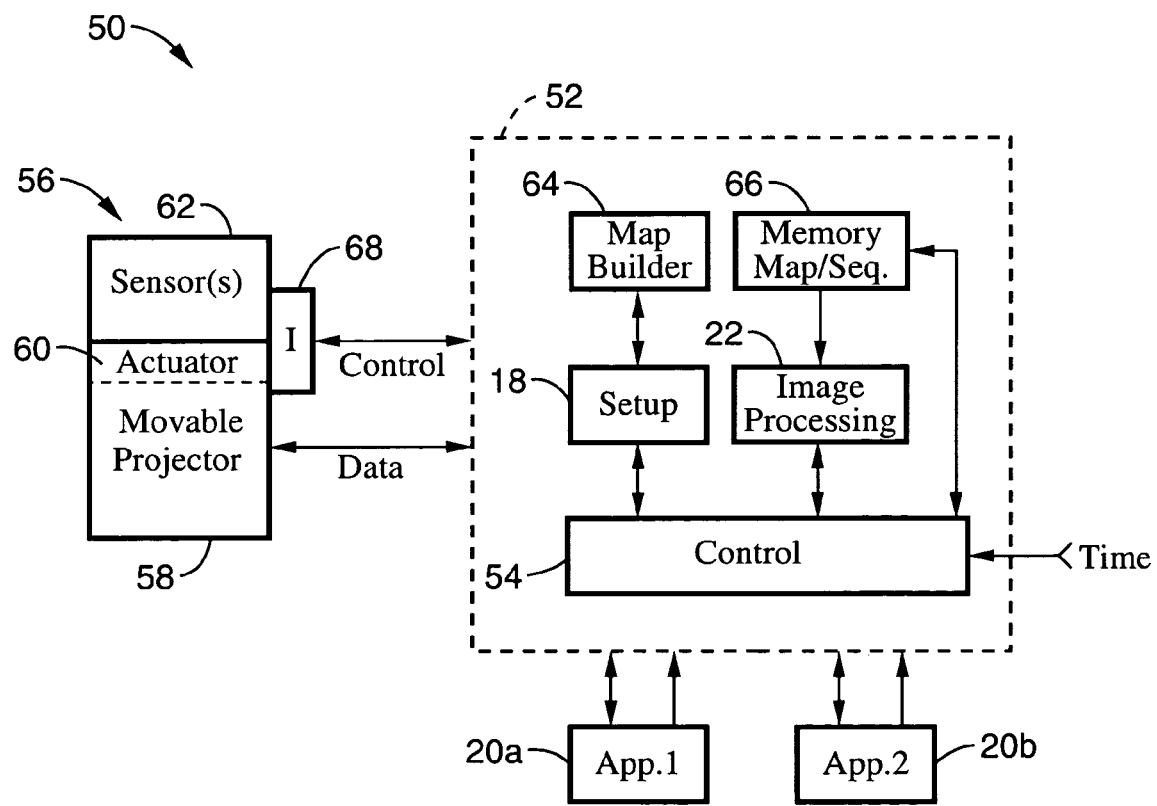
FIG. 4 is a block diagram of a projection motion control system embodiment of the present teachings, showing multi-directional projection output with integral optical sensor within the head of the projection apparatus.

FIG. 4 illustrates an example embodiment 50 for multi-directional projection with an integral sensor for detecting characteristics of objects within the vicinity of the projector. Computer 52 is shown as having control programming 54 for controlling projection head 56 including projection element 58 which can be moved through a range of directions in response to activating actuators 60 to change projected output direction. In addition, at least one sensor 62 is incorporated for sensing characteristics of the surroundings which could impact projection quality. Setup module 18 is shown coupled to map builder programming 64, while image processing module 22 is shown coupled to memory 66 shown for storing the map and operation sequences. A communication interface 68 is shown for communicating between projection head 56 and computer 52, for example communicating status and data digitally for controlling the operation of actuators and returning status information. It should be appreciated that the control commands and image data can be communicated using any convenient communication protocol and connection type, such as using either a wired or wireless connection. Control and image data are shown communicated separately between computer 52 and projection head 56, although communication can be alternatively implemented combining these signals into a single digital stream.

Control programming 54, such as implemented as one or more application program interfaces (APIs), is shown receiving image and control data from different application programs 20a, 20b. Control operations executed by control programming 54 can be optionally synchronized based on a timing signal, represented by receipt of a time signal which can provide real time, time based on GPS signals, or other forms of time events to which operations are to be synchronized.

Sensor 62 is configured for registering characteristics of nearby surfaces upon which the image projection element can be directed. Any convenient sensor can be utilized for registering these characteristics, such as separate photo detectors to detect reflected light intensity, an optical imager (e.g., camera element) to detect any of a number of surface characteristics, a rangefinding device, or other devices capable of providing information about the surroundings. The sensor can be mounted with its own motion control actuators, or can utilize the motion control actuators of the projector element. Mounting the sensor to the projector element, or using a sensor integrated with the projector element, assures that the projector and sensor move together, thus reducing the need for separate motion control devices for the sensor and eliminating the need to translate sensor directions into projection directions.

It should be appreciated that using a form of optical imager as the sensor provides a number of benefits, such as that it can be selectively focused to determine distance, while image information obtained from it can be processed to determine additional characteristics, such as reflection, color, texture, ambient lighting and the like.

The mapping operation can be performed in any desired manner, before or during projection output by an application. In one mode, the map is generated in response to execution of a setup process for the projector. Alternatively, the map can be generated automatically from registering its surroundings either before or during projector operation. The map can be updated automatically during projector use and/or by updating it with a new mapping operation at selected or periodic intervals.

The programming is configured for modifying the projection of the optical output by performing image processing which changes image characteristics encoded within the electrical source signal in response to the map, or by sending control signals to optical elements (e.g., focus, zoom, and so forth), to change output based on mapped characteristics of the output direction. The programming can perform image processing to modify the size, aspect ratio, focus, color, hue, brightness, and other desired attributes either separately or in various combination.

It should be appreciated that information is retrieved from the map in relation to where the image is being projected, or for a location upon which the image will soon be projected. For example, in one implementation, the pan and tilt angles are used as indices for accessing map data. The map can be generated in a mapping process performed to detect and define characteristics for surfaces within the surroundings of the image projection element to which output can be projected upon. One important characteristic to be mapped is distance between projector element and nearby surfaces upon which the projection is to be displayed. It will be appreciated that as a projected image is moved across irregular surfaces, the distance between the projector and the surface(s) onto which an image is projected may change. In such instances, the focal length may need to be changed as the image is moved across the surface(s) to allow for proper viewing. For example, consider a nearby surface at a distance of x feet from the projector which slopes away to a surface that is y feet from the projector (where x≠y), in which case it likely would be necessary to change the focal length as the projected output moves along the surface to maintain a focused image. Numerous other characteristics of the surfaces can be taken into consideration, including reflectivity, texture, color, and ambient lighting. The surface characteristics are looked up from the map, for example, based on the direction that the projector is pointing, such as by pan and tilt angles. Any convenient means of look-up mechanism can be utilized, such as a table, array, list, and other mechanisms as will be understood by one of ordinary skill in the art.

It should be recognized that the projector can be configured to project any type of image, ranging from still images to full-motion video images, or any combination thereof. In addition, the light output from the projector can be modulated to form a remote control command sequence for receipt by devices capable of receiving commands optically (e.g., visible, near-infrared, and/or infrared optical energy). The optical output from the projector can be generated using any desired technology, such as light sources passing through a variable transparency pixilated grid, light sources being directed with micromirror arrays, arrays of lighting elements (e.g., LEDs, OLEDs, and other light generating displays), ray tracing projection units (e.g., laser, LEDs, and so forth), and other techniques and combinations thereof for controlling projected light output.

By way of example, one projector implementation includes: (a) a light source; (b) a modulation element configured for modifying the intensity, color, or a combination of intensity and color, of the light projected from the light source; and (c) an optical assembly for directing the light projected from the image projection element. It should be noted that the combination of light source and modulation element are configured for converting the electronic source signal into a projected optical output.

In one mode of operation, the speed with which the motion control element executes the motion is controlled by a speed setting or motion profile, such as established by the application program or user. It should be noted that the speed and motion profile also provide for the generation of random speeds, random motions between a "from" and "to" location, ramping speeds, and other variations which can be accommodated by the programming. By way of example, the pan and tilt speeds can be preferably set within the range of between approximately 0.25 degrees per second to approximately 60 degrees per second.

While operation of the image projection system is described utilizing a computer processor for controlling operating aspects, other circuits can be alternatively employed, such as digital signal processors, multiprocessing arrangements, as well as logic-arrays, custom circuits, and so forth. The processor, or other control device, can be contained within a computer device configured for executing the programming in addition to executing desired application programming. Examples include personal computers, workstations, networked computers, gaming computers, multimedia computers, and so forth. Alternatively, all or a portion of the computer processing and programming can be incorporated within the projector device itself, wherein application programming operating on a separate computer can send operating commands as well as image/video data to the multi-directional projector.

Figure 5:
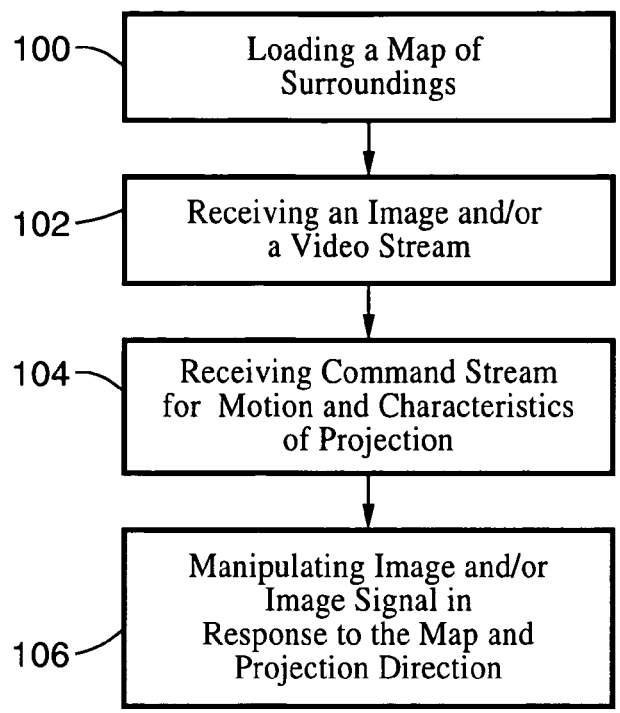
FIG. 5 is a flow diagram of general steps in the multi-directional projection method according to an aspect of the present teachings.

FIG. 5 illustrates an example of a projection method according to the teachings herein. Mapping is performed as represented in block 100 to gather information about surfaces to which the image projector can be directed for displaying its output. A map is generated and retained in memory, which is accessible to the system, for these surfaces upon which an image can be projected. It should be noted that all areas accessible to projector motion can be subject to projection or, alternatively, characteristics from the map can be used to limit the range of surfaces based on distance, surface reflectivity, color, ambient light or other desirable criterion. For example, it will be appreciated that projecting an image onto select surfaces, such as a slotted air outlet duct or active halogen light fixture, would be of minimal display value wherein the system is configured for blocking projection to these areas depending on parameters set by the user.

To project images, an electrical signal is received and converted to a projected optical output from the image projector as per block 102. Motion commands are received as in block 104 for controlling motion and characteristics of projection. In block 106, the projector output is directly manipulated (e.g., focus, zoom, and other optical changes) and/or the image signals are modified (e.g., change size, color, shape, contrast, intensity, and so forth) in response to data looked up from the map based on the direction of the optical output being projected.

Figure 6:
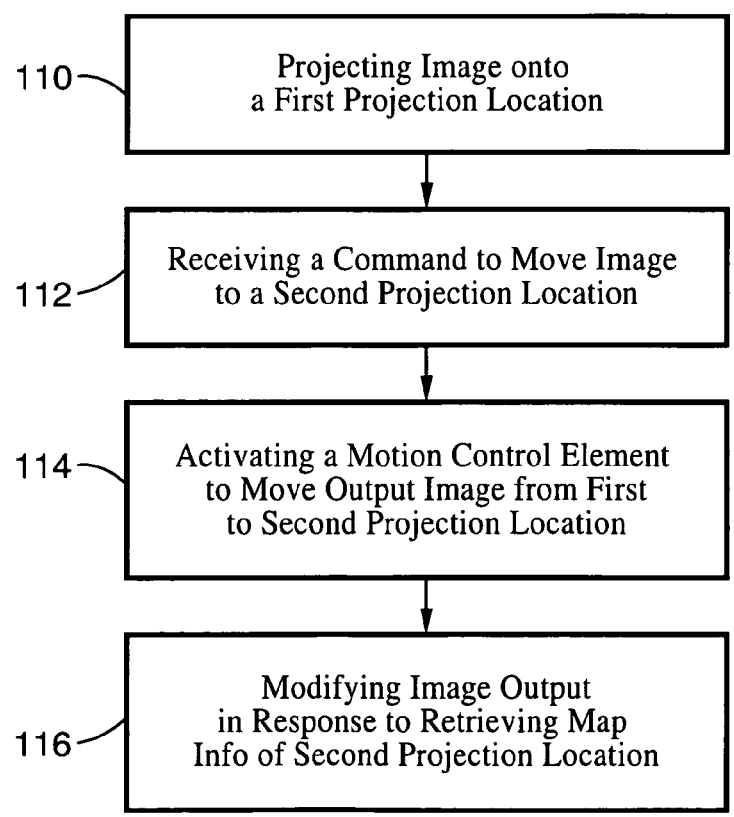
FIG. 6 is a flow diagram of a method for moving an image between a first projection location and a second projection location according to an aspect of the present teachings.

FIG. 6 illustrates another example of the image projection method. In this example, an image is projected from a projection element onto a first projection location as represented by block 110. As per block 112, a command is received to move the image onto a second projection location. Then, according to block 114, a motion control element coupled to the image projection element is activated to move the output image from the first projection location to a second projection location. Finally, image output is modified as per block 116 in response to accessing mapped characteristics of the second projection location.

Interfacing with the projection apparatus can be accomplished using a number of alternative mechanisms. In one embodiment the projector control software is configured for being executed with API calls made available to one or more source applications operating on the same computer. By way of example, the programming can be divided into a Setup API and a Control API. The commands in the Setup API are used to establish (setup) the parameters used during projection control. The Control API translates commands from the applications to control projector operations and also interacts with the image processing routines to process images accordingly. The use of APIs allows projector control functions to be rapidly integrated within any desired application programming. By way of example, a Setup API and a Control API are provided in this embodiment.

The following is a partial list of API command information provided by way of example.

Init (Position)
Description: Resets Projector to position and initializes Image Processor. Modified Image is black (no image).
Parameters: Position: X, Y, Z coordinates (or pan, tilt angles)
Map (File)
Description: Builds a map of surroundings
Parameters:
   Map File—A description of the space surrounding projector.
Move (From, To, Speed, Display)
Description: moves projector from the "From" position to the "To" position according to given speed, or speed characteristic. In one mode the projected image is black (no image) when projector begins moving from the "From" position.
Parameters:
   From: X, Y, Z coordinates (or pan, tilt angle values)
   To: X, Y, Z coordinates (or pan, tilt angle values)
   Speed: Degrees per second
      If not defined—generates random, variable speed.
   Display:
      True—the projector image stays on during movement. If the image is moved across an irregular surface and/or the distance between the projector and the surface changes during movement, the focal length of the image projection element may necessarily change to maintain focus during movement (e.g., maintain focus along an infinite number of projection locations).
      False—the projector image goes to black during movement.
Nudge(Horizontal degrees, Vertical degrees, Speed, Display)
   Description: This moves the Projector the number of degrees specified for both Horizontal and Vertical as the given speed and with Display on or off.
   Parameters:
      Horizontal degrees: 0-360 degrees
      Vertical degrees: 0-360 degrees
      Speed: Degrees per second
         If not defined—generates random, variable speed.
      Display:
         True—the Projector image stays on during movement. If the image is moved across an irregular surface and/or the distance between the projector and the surface changes during movement, the focal length of the image projection element may necessarily change to maintain focus during movement (e.g., maintain focus along an infinite number of projection locations).
         False—the Projector image goes to black during movement.
Rotate(Number of times, degrees per rotation, Speed)
Description: rotates projector in horizontal direction and moves it up or down with the degrees per rotation.
Parameters:
   Number of times: specifies number of times to rotate.
   Degrees per rotation: how much to move up/down per rotation.
   Speed: Degrees per second.
Stop( )
Description: stops moving projector, continues to display image.
Parameters: None
Continue( )
Description: Start moving projector with current defined "movement parameters".
Parameters: None
Random(bounded space, speed, type)
Description: Move projector randomly in specified movement type.
Parameters:
   Bounded space:
      If defined, only move the Projector within defined 3D space.
   Speed: Degrees per second (whether horizontal or vertical)
   Type: smooth, jerk, zigzag, and so forth.
Advanced API functions:
Registering object surface characteristics
Video Effects (in, out)
Focus (control "in focus" to "out of focus")
Light Intensity (brightness)
Fade(black to white, white to black, speed)
Zoom (control image size and intensity)

It will be appreciated that the multi-directional projection system and method described herein can be implemented according to variations and operating modes, some of which have been discussed, the following being provided by way of further example and not limitation.

In one mode, referred to herein as "time line" mode, the application can place commands within, or for retrieval by, the projector control module for execution based on a time line. The commands may be stored in the sequence portion of memory 66 shown in FIG. 4. For example the time line can provide global synchronization based on a video time line "HH:MM:SS:FF". It will be recognized that timing may be performed based on local timing, or based on common timing signals such as timing signals received from a Global Positioning System (GPS) satellite.

In one mode of operation of the multi-directional projection system and method, the changes in projection direction are generated in response to an audio and/or video input. In this way, the motions of the projected images or video are "choreographed" in response to aspects of the audio or video feed. By way of example, a simple "motion audio" mode can utilize averages audio frequency to control vertical projector movement while the beat is registered for controlling horizontal movements. However, it should be appreciated that the audio can be analyzed in response to registering of any selected characteristics from which motion commands are generated. Similarly, the type of image processing performed can be modulated in response to the audio or video characteristics. One of ordinary skill in the art will appreciate the numerous mechanisms available upon which audio and video can be analyzed, and thus used for driving motion and image processing within the present system. It should be noted that the audio or video input for driving projection changes can be signals which are directed toward components other than the multi-directional projection system, such as video directed at a flat panel display, or audio generated from a music system.

In one mode of operation, the multi-directional projection system is utilized for projecting remote control command sequences and directing them to any device (e.g., TV, PC, audio system, audio/video player, game console) within the vicinity of the projection system which is capable of receiving optical remote control commands. It should be appreciated that the projector can be adapted to perform this remote control aspect either separately or in combination with other aspects described herein. Remote control commands to be communicated by the projector are encoded within all, or a portion, of the image being output by the projector. For example turning all projected pixels between an on-state (e.g., in any portion of the spectrum (color) compatible with the receiving device) and an off-state in response to the bit encoding of a command string to communicate that command string to all remote control devices upon which the light of the projected image sequence falls. To provide greater location selectivity, the remote control command can be encoded within some portion of the projected output (e.g., a block of pixels) which are directed upon the optical receiver of a remote control device. The location of the optical receiver within the remotely controllable device is contained in the map (or a separate map if desired) wherein one mode of the system is adapted to adjust optical or electrical aspects of the image signals based on the map. The projection system is also configured for adjusting the framing rate of projection output to match bit durations of remote control command sequences as required to communicate with any specific remote control device receiver. The remote control mode allows application programming to communicate with nearby optical remote control devices, thus allowing for example, a gaming application to send commands to an audio system, television, or other optical remotely controlled device in response to directives from the gaming application. It should be appreciated that the remote control signals can be embedded within otherwise conventional images or videos so as to simultaneously provide for both viewing and remote control operation.

To communicate with nearby remotely controllable devices, the programming is configured for: (a) maintaining information on the location of one or more devices within the range of the image projection element which are responsive to optical remote control commands; (2) maintaining optical sequence information for each optical remote control command to which each of the one or more devices is responsive; and (3) controlling the motion actuation to direct the optical output of the image projection element toward a given device of the one or more devices in response to receipt of a remote control command to be transmitted by the projector; (4) generating the electrical source signal by converting the remote control command based on the maintained optical sequence information for the given device; and (5) modifying electrical source signals based on the map to limit receipt of optical image, as necessary, to the given device.

If more than one remotely controlled device is in the vicinity of projection, the size of the projected image portion containing the command sequence can be reduced so that commands are selectively communicated to a given device. Projection output size can be controlled by using a zoom mechanism (e.g., changing angle subtended by projection cone), or by reducing the number of pixels from which light is projected, or a combination of zoom and reducing the number of pixels from which the light is output.

The multi-directional projection system can be configured for operation in any portion of the optical spectrum, such as in the ultra-violet, near-ultra-violet, visible, near-infrared and/or infrared portions of the optical spectrum. In the case of communicating with remote control devices, it will be understood that many conventional optical remote control devices operate in the near-IR, or IR portions of the spectrum which may be beyond the spectral range of a visible output projector element. It should be noted, however, that controlling non-visible spectra remote control devices does not require compatible spectral output from the entire projector. Communication in these cases can be established using as few as one optical element, such as a simple LED (e.g., near-IR, IR, or UV), which can be separate from, or integrated within, a visible display array to provide multi-directional output with a spectrum compatible with the optical remote control receiver. Numerous variations of remote control communication can be implemented by one of ordinary skill in the art without departing from the teachings herein.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An image projection system, comprising:
   an image projection element;
   a motion control element coupled to said image projection element and configured for moving an image projected by said image projection element from a first projection location to a second projection location;
   a pixel redirection device, coupled to said image projection element, and configured for simultaneously directing any desired collections or groups of pixels within an image to different locations offset from the projection element direction;
   a control processor configured for:
      receiving an electrical source signal and converting the signal to an image for projection by said image projection element,
      actuating said motion control element in response to receipt of a motion control command,
      mapping characteristics of locations upon which said image can be projected, said map containing information on optical characteristics of the projection locations,
      modifying said electrical source signal to compensate for irregular surfaces according to the map of projection location characteristics, wherein the image is modified based on the mapping of those characteristics, and
      creating distributed and/or sparse effects spanning a larger distance than to which said image projection element is directed.

2. A system as recited in claim 1, wherein said control processor is further configured for generating said map.

3. A system as recited in claim 1, wherein said image projection element comprises:
   a light source;
   a modulation element configured for modifying intensity, color, or both intensity and color, of light from said light source; and an optical assembly configured for projecting said light from said image projection element;
wherein said light source and said modulation element convert said electronic source signal into said image for projection by said optical assembly.

4. A system as recited in claim 1, wherein said motion control element controls horizontal angular motion, or vertical angular motion, or both horizontal angular motion and vertical angular motion.

5. A system as recited in claim 1, wherein said control processor is further configured for controlling speed of movement of said image according to a predetermined speed setting or motion profile.

6. A system as recited in claim 1, wherein said map includes distance information associated with projection locations.

7. A system as recited in claim 1:
wherein said map includes information associated with optical characteristics of projection locations; and
wherein said optical characteristics are selected from the group of optical characteristics consisting of distance, reflectivity, texture, color, and ambient lighting.

8. A system as recited in claim 1, further comprising:
a zoom actuator for modulating projection cone angle output by said image projection element;
wherein said control processor is configured for controlling said zoom actuator in response to receipt of a zoom control command, or in response to mapped characteristics of projection locations, or in response to both receipt of a zoom control command and characteristics of projection locations.

9. A system as recited in claim 1, further comprising:
a focus actuator for modulating focus of said image projection element;
wherein said control processor is configured for controlling said focus actuator in response to information retrieved from said map for a given direction of image projection.

10. A system as recited in claim 1, further comprising:
a sensor for registering projection location characteristics to which said image projection element can be directed.

11. A system as recited in claim 1, further comprising:
a sensor for registering projection location characteristics to which said image projection element can be directed;
wherein said sensor comprises an optical imaging device or a range finding device, or both an optical imaging device and a range finding device.

12. A system as recited in claim 1, wherein modifying said electrical source signal comprises processing signal characteristics associated with image size, aspect ratio, focus, color, hue, or brightness, or any combination thereof.

13. A system as recited in claim 1, wherein said control processor comprises a computer device configured for executing projection control programming and application programming.

14. A system as recited in claim 1, wherein said control processor is further configured for:
maintaining information associated with location of one or more remote devices within the range of said image projection element which are responsive to optical remote control commands;
maintaining optical sequence information associated with optical remote control commands to which said remote devices are responsive;
controlling said motion control element in response to receipt of a remote control command to be transmitted by said projection system to a said remote device; and
modifying said electrical source signals based on said remote control command and said map to limit receipt of a projected image to a given device.

15. A system as recited in claim 1, wherein said image projection element is adapted for projecting an image in the visible, near-infrared or infrared portions of the optical spectrum.

16. An image projection system, comprising:
an image projection element;
a motion control element coupled to said image projection element for controlling horizontal angular motion, or vertical angular motion, or both horizontal angular motion and vertical angular motion of an image projected by said image projection element;
a pixel redirection device within the image projection element, and configured for simultaneously directing any desired collections or groups of pixels within an image to different locations offset from the projection element direction;
a focusing lens assembly coupled to said image projection element;
an optical detector element coupled to said image projection element;
said optical detector element configured for registering distance to a projection location to which said image projection element can be directed by said motion control element; and
a control processor configured for:
generating a map of distances to projection locations, upon which the image is projected, in response to information received from said optical detector as a function of pan angle and tilt angle,
receiving an electrical source signal and modifying it to compensate for irregular surfaces according to said generated map;
converting said electrical source signal to an image for projection by said image projection element,
actuating said motion control element to move an image projected by said image projection element from a first location to a second location in response to the receipt of a motion control command,
modifying focal length of said focusing lens assembly in response to distance information in said map associated with projection locations, and
creating distributed and/or sparse effects spanning a larger distance than to which said image projection element is directed in response to the pixel redirection device operating in combination with the image projection element.

17. A system as recited in claim 16:
wherein said control processor is further configured for processing said electrical source signal to modify image size, aspect ratio, color, hue, brightness, or any combination thereof, in response to a map of projection location characteristics; and
wherein said electrical source signal is modified by said control processor prior to projection of an image by said image projection element.

18. An image projection method, comprising:
projecting an image, as a projected image, at a first projection location in response to output from an image projection element;
simultaneously directing any desired collections or groups of pixels from within the projected image, in response to a pixel redirection device coupled to the image projection element, to different locations which are offset from the first projection location;

receiving a command to project the image at a second projection location;

mapping characteristics of locations upon which said image can be projected;

redirecting image projection from the first projection location to the second projection location; and modifying the image based on mapped characteristics associated with the second projection location to compensate for irregular surfaces according to the mapped characteristics of projection locations;

wherein said mapped characteristics contain information on the optical characteristics of projection locations, including said first and second projection locations upon which the image is projected; and generating distributed and/or sparse effects spanning a larger distance than to which the image projection element is directed in response to the pixel redirection device operating in combination with the image projection element.

19. A method as recited in claim 18, wherein modifying the image comprises changing optical characteristics of projection, or modifying signals carrying the image prior to projecting the image onto the second projection location, or both changing the optical characteristics of projection and modifying the signals carrying the image.

20. A method as recited in claim 18, wherein modifying the image comprises changing a focal length in response to retrieving a distance value from the mapped characteristics.

21. A method as recited in claim 18, further comprising mapping the characteristics associated with the second projection location.

22. A method as recited in claim 18, further comprising:

moving the image from the second projection location to the first projection location; and modifying the image in accordance with mapped characteristics associated with the first projection location.

23. A method as recited in claim 18, further comprising:

moving the image from the second projection location to a third projection location; and modifying the image in accordance with mapped characteristics associated with the third projection location.

24. A method as recited in claim 18, further comprising:

moving the image from the second projection location to a third projection location;

modifying the image in accordance with mapped characteristics associated with the third projection location; and wherein the image is directed across a projection surface from the first projection location to the third projection location.

25. A method as recited in claim 18, wherein the image comprises from still images to full motion video images.

* * * * *